(12) United States Patent
Murschall et al.

(10) Patent No.: US 6,607,822 B2
(45) Date of Patent: Aug. 19, 2003

(54) BIAXIALLY ORIENTED FILM SUPPORT FOR MAGNETIC RECORDING MEDIA

(75) Inventors: Ursula Murschall, Nierstein (DE); Andreas Stopp, Ingelheim (DE); Guenther Crass, Taunusstein (DE); Harald Mueller, Taunusstein (DE)

(73) Assignee: Mitsubishi Polyester Film GmbH (DE)

( * ) Notice: Subject to any disclaimer, the term of this patent is extended or adjusted under 35 U.S.C. 154(b) by 0 days.

(21) Appl. No.: 09/811,280

(22) Filed: Mar. 16, 2001

(65) Prior Publication Data

US 2001/0033948 A1 Oct. 25, 2001

(30) Foreign Application Priority Data

Mar. 17, 2000 (DE) .......................................... 100 13 263

(51) Int. Cl.$^7$ .................................................. G11B 5/78
(52) U.S. Cl. ....................... 428/336; 428/409; 428/480; 428/694 SL; 428/694 SG
(58) Field of Search ................................ 428/336, 409, 428/480, 694 SL, 694 SG

(56) References Cited

U.S. PATENT DOCUMENTS

| | | |
|---|---|---|
| 3,227,675 A | 1/1966 | Papalos |
| 4,567,030 A | 1/1986 | Yuasa et al. |
| 5,432,454 A * | 7/1995 | Durkin ........................ 324/452 |
| 5,919,550 A * | 7/1999 | Koseki et al. ............... 428/141 |
| H1857 H * | 9/2000 | Germinario et al. ......... 264/130 |
| 6,214,530 B1 * | 4/2001 | Morrison et al. ........... 430/527 |

FOREIGN PATENT DOCUMENTS

| | | |
|---|---|---|
| DE | 35 34 143 | 4/1987 |
| DE | 197 36 398 A1 | 2/1999 |
| EP | 0 177 674 | 4/1986 |
| EP | 0 236 945 | 9/1987 |

* cited by examiner

*Primary Examiner*—Stevan A. Resan
(74) *Attorney, Agent, or Firm*—ProPat, L.L.C.

(57) ABSTRACT

The present invention relates to an at least single-layer, biaxially oriented film support for magnetic recording media which is predominantly composed of crystallizable polyester, having a thickness in the range from 1 to 40 μm. The film has, over its total roll length and roll width and after it has been made up into customer rolls, an electrostatic charge build-up which is in the range from −80 kV/m to +80 kV/m, the contact pressure at the roll cutters during make-up being set in the range from 300 N/m to 350 N/m. The film is drawn between electrical discharge means, which are arranged close to the roll, along the film path in the make-up machine, and is particularly suitable for high-quality audio, video or computer tapes and for floppy disks or thermal tapes.

8 Claims, No Drawings

BIAXIALLY ORIENTED FILM SUPPORT FOR MAGNETIC RECORDING MEDIA

The invention relates to a single-layer or multilayer biaxially oriented film support for magnetic recording media which is predominantly composed of crystallizable polyester. The film is distinguished by the fact that, after coating, it has a low laser defect rate and is therefore very suitable for high-quality magnetic recording media. The invention furthermore relates to a process for the production of the film.

BACKGROUND OF THE INVENTION

Owing to their superior properties, such as tensile strength, their ultimate tensile strength, their modulus of elasticity, their transparency, their chemical and thermal stability and the like, biaxially oriented films of polyester, in particular of polyethylene terephthalate, polyethylene naphthalate or polycyclohexanedimethanol terephthalate, are used in large amounts in numerous industrial areas, and also as film supports for magnetic recording media, such as, for example, for audio, video and computer tapes and floppy disks, thermal printing tapes, etc.

For the various fields of use, the polyester films must meet specific requirements, which are usually achieved with the aid of the raw material formulations or by means of specific process engineering during the film production.

Thus, for example in the case of film supports for magnetic tapes, in addition to uniform and good sliding behavior and high abrasion resistance, particularly high requirements are set with respect to the homogeneity of the surface and the static behavior, because undesired protuberances on the surface of the support films, electrostatic errors and high static charge build-up within the magnetic layer applied to this surface lead to information losses and so-called laser defects which reduce the quality of the tape and limit the potential uses of the information medium. Overcoming or reducing the effect of, said electrostatic errors and high electrostatic charge build-up on the surface by incorporating inorganic and/or organic inert particles having a defined particle size distribution forms part of the prior art. Examples of such inert particles, which may be used alone or in combination, are $CaCO_3$, $TiO_2$, $Al_2O_3$, $ZrO_2$, $BaSO_4$, calcium phosphate, kaolin, $SiO_2$ or natural and synthetic silicates.

To improve their infinity to the polymer matrix and hence to improve the quality, i.e. the properties of the moldings produced using these inert particles, these inert particles are subjected to a surface treatment, depending on their chemical composition.

A description of the possibilities of surface modification of carbonate fillers with the aim of influencing the interactions at in particular the $CaCO_3$/polymer interfaces is given in Plaste und Kautschuk [Plastics and Rubber], 37th year, Part 8/1990, page 269 et seq.

U.S. Pat. No. 3,227,675 describes the treatment of clays (kaolins) with organosilicon compounds for better incorporation into a polymer matrix.

DE-A-35 34 143 describes monodisperse $SiO_2$ particles which are preferably intended for chromatographic purposes and whose functional groups present on the surface have been reacted with organotrialkoxysilanes without the existing properties of the particles being adversely affected.

A process for the modification of synthetic silicate fillers with sulfur-containing organosilicon compounds for improving their incorporation into vulcanizable rubber blends is described in EP-A-0 177 674.

U.S. Pat. No. 4,567,030 likewise describes monodisperse mixed oxide particles which can be used as fillers and whose surfaces may have been modified for improving the resistance to moisture and the "dispersibility in a resin", i.e. for reducing the agglomerate formation with an aminopropyltrimethoxysilane or silanes which contain ethylenically unsaturated groups. In EP-A-0 236 945, it is pointed out that, for reducing agglomerate formation during polymerization, the monodisperse mixed oxide particles are expediently subjected to a treatment with a silane, titanium or aluminum coupling reagent.

None of these publications describes methods which makes it possible to reduce the laser defect rate, which very greatly influences the quality of the coated magnetic tape.

Laser defects are coating errors. They are thin, round to oval areas in a magnetic layer or, in the advanced stage, even round or oval holes in the magnetic layer (transparent areas). In the case of laser defects, the polyester film is completely or partly exposed. The edge of the magnetic layer is highly fissured, which indicates a process similar to local tearing away of the magnetic layer. The defect has a diameter of between 0.2 and 0.8 mm. During the actual coating of the magnetic tape, some of the laser defects are not yet fully developed. The errors are fully displayed when the magnetic tape is cut into so-called "pancakes". The laser defects are detected by means of a laser scanner. A 100% check is performed. On detection of a laser defect, the entire pancake is rejected in each case. It would be of great advantage for the magnetic tape coating industry to use a film support which, after coating, leads to few or, better still, even no laser defects at all. Usually, the rejection rate owing to laser defects is between 3 and 5%.

It was therefore the object of the present invention to provide an at least single-layer, biaxially oriented film support for magnetic recording media having a total thickness of from 1 $\mu$m to 40 $\mu$m, which essentially comprises polyester and which is distinguished by the fact that the laser defect rate is less than 2%, in particular less than 1%.

SUMMARY OF THE INVENTION

The object is achieved by an at least single-layer polyester film of the generic type stated at the outset and having a thickness of from 1 $\mu$m to 40 $\mu$m, wherein the film has, over the total roll length and roll width and after it has been made up into customer rolls, an electrostatic charge build-up which is in the range from −80 kV/m to +80 kV/m, in particular form −70 kV/m to +70 kV/m and preferably from −60 kV/m to +60 kV/m, in combination with a contact pressure at the roll cutters which is in the range from 300 N/m to 350 N/m, in particular from 310 N/m to 340 N/m.

DETAILED DESCRIPTION OF THE INVENTION

If the contact pressure of the roll cutters is >350 N/m, electrostatic errors (static marks) occur to a greater extent and lead to a higher laser defect rate.

If the contact pressure at the roll cutters is <300 N/m, the quality of the film in the roll is substantially adversely affected, which leads to considerable problems during further processing.

More than surprising is the fact that a film support for magnetic recording media which, after making up into customer rolls, has an electrostatic charge build-up of from −80 kV/m to +80 kV/m, in particular from −70 kV/m to +70 kV/m, preferably from −60 kV/m to +60 kV/m over the total roll length and roll width and was wound into customer rolls with a contact pressure at the roll cutters which is in the range from 300 N/m to 350 N/m, in particular from 310 N/m to 340 N/m, has a laser defect rate of ≦2% and in particular ≦1%.

In an attempt to reduce the laser defect rate, the person skilled in the art would have first improved the internal purity of the polyester raw material and investigated the production plant for contamination by foreign substances (oil, lubricants, oligomers, etc.). Furthermore, the person skilled in the art would have then reduced the production and make-up speeds in order thus to achieve a possible reduction in the laser defect rate.

It was therefore more than surprising for the person skilled in the art that an at least single-layer film support for magnetic recording media can be produced, with said electrostatic charge build-ups in combination with said contact pressure at the roll cutters, at high speeds of up to 400 m/min in an outstanding quality with a laser defect rate of ≦2%, in particular ≦1%.

The outstanding values for the electrostatics in combination with said contact pressure and the production speeds of up to 400 m/min are achieved by virtue of the fact that specific electrical discharge rods having improved discharge performance are used.

Electrical discharge rods form Eltex/Weil am Rhein of the R50/R51 type are particularly suitable. Earth conductors which are isolated and which reinforce the electrical field of the active tips and hence permit higher speeds and greater distances with very good discharge performance are advantageous.

The films may be single-layer or multilayer and may have a symmetrical or asymmetrical structure, differently formulated polyesters or formulated or unformulated polyesters and those of the same chemical composition but with different molecular weight and different viscosity being capable of being purified by coextrusion.

The film according to the invention essentially comprises a crystallizable polyester, a crystallizable polyethylene naphthalate (PEN) or mixtures thereof.

Crystallizable polyesters or crystallizable polyethylene naphthalates are understood as meaning crystallizable homopolymers crystallizable compounds crystallizable copolymers crystallizable recycled material other variations of crystallizable thermoplastics.

The polyesters can be prepared both by the transesterification process, for example with the aid of transesterification catalysts, such as, for example, Zn, Mg, Ca, Mn, Li or Ge salts, and by the direct esterification process (PTA process), in which antimony compounds are used as polycondensation catalysts and phosphorus compounds as stabilizers. The RSV value of the polyesters is preferably in the range from 0.4 to 1.0 d/g.

Examples of polyesters are polycondensates of terephthalic acid, isophthalic acid or 2,6-naphthalenedicarboxylic acid with glycols having 2 to 10 carbon atoms, such as polyethylene terephthalate, polybutylene terephthalate, poly-1,4-cyclohexylene-dimethylene terephthalate, polyethylene 2,6-naphthalenedicarboxylate, polyethylene naphthalate/bibenzoate or polyethylene p-hydroxybenzoate.

The polyesters may be composed of up to 50 mol %, in particular of up to 30 mol %, of comonomer units, a variation in the glycol component and/or in the acid component being possible. As acid component, the copolyesters may contain, inter alia, 4,4-bibenzoic acid, adipic acid, glutaric acid, succinic acid, sebacic acid, phthalic acid, isophthalic acid, 5-Na-sulfoisophthalic acid or polyfunctional acids, such as trimellitic acid, etc.

The polyester films can be produced by known processes from a polyester raw material with, if required, further raw materials and/or further additives customary for film supports for magnetic recordings, in conventional amounts of from 0.1 to not more than 20% by weight, both as a monofilm and as multilayer, possibly coextruded films having identical or differently formed surfaces, it being possible, for example, for one surface to be pigmented and the other surface to contain little or no pigment. Furthermore, one or both surfaces of the film may be provided with a conventional functional coating by a known method.

In the preferred extrusion process for the production of the polyester film, the molten polyester material is extruded through a slot die and quenched as a substantially amorphous polyfilm on a chill roll. This film is then heated up again and is oriented in the longitudinal and transverse direction or in the transverse and longitudinal direction or in the longitudinal direction, in the transverse direction and again in the longitudinal direction and/or transverse direction. The orientation temperatures are in general $T_g+10$ K to $T_g+60$ K ($T_g$=glass transition temperature), the stretching ratio of the longitudinal stretching is usually from 2 to 6, in particular from 3 to 4.5, that of the transverse stretching is from 2 to 5, in particular from 3 to 4.5, and that of any second longitudinal stretching carried out is from 1.1 to 3. The first longitudinal stretching can, if required, be carried out simultaneously with the transverse stretching (simultaneous stretching). This is followed by heat setting of the film at oven temperatures of from 200 to 260° C., in particular from 220 to 250° C. The film is then cooled and rolled up.

The rolled-up film is made up into appropriate customer rolls on a make-up machine at speeds of from 300 to 400 m/min. The make-up procedure is effected using tailored winding tensions and contact pressures, characteristics depending on the film running length being employed both for tension and for contact pressure.

According to the invention, the contact pressure is from 300 N/m to 350 N/m, in particular from 310 N/m to 340 N/m. The winding tension is advantageously from 90 N/m to 200 N/m.

A plurality of electrical discharge means are installed along the film path in the make-up machine. In particular, discharge rods, preferably of the R50/R51 type from Eltex/Weil am Rhein, are installed on the roll.

After make-up, the customer rolls are tested, packed and delivered.

Owing to the surprisingly low laser defect rate after coating of the magnetic tape and after cutting of the magnetic tape into pancakes, the film support according to the invention is outstandingly suitable for magnetic recording media for high-quality audio, video and computer tapes and for floppy disks, thermal tapes, etc.

The invention is explained in more detail below with reference to embodiments, without being restricted to them.

The individual properties are measured according to the following standards or methods:

Light Transmittance

Light transmittance is understood as meaning the ratio of the total light transmitted to the quantity of incident light.

F5 Longitudinal Value

The value indicates the tensile strength of the film at 5% elongation. The measurement was carried out according to DIN 53 455.

Modulus of Elasticity

The modulus of elasticity was measured according to DIN 53 457. The F5 value and the modulus of elasticity were determined using a ZWICK apparatus, type 1445, the measuring length being 100 mm, the strip width 15 mm and the take-off speed 10 mm/min (modulus of elasticity) or 100 mm/min. The stated values are based on five individual measurements.

$R_a$ Value

The $R_a$ value expresses the surface roughness of the film in numerical terms as an arithmetic mean of all distances of the roughness profile R from the center line.

The measurement was carried out according to DIN 4768 by means of a perthometer SP 6 surface measuring apparatus from Feinpruf GmbH, Gottingen. The stated values are based on six individual measurements, the highest value being omitted from the calculation of the mean value. The cut-off was 0.25 mm in each case.

In addition, the center line average value was determined by means of the T20S/RP50 Hommel tester at a cut-off of 0.08 μm (DIN 4762/1). Here, the following parameters were chosen:

| | |
|---|---|
| LT (Length of the area): | 0.48 mm X = 400 |
| ZP (Width of the area): | 0.4 mm Y = 50.000 |
| MB/(Measuring range): | 0.2 mm Z = 150 |
| n = 50 (Number of lines) | |
| Vt = 0.05 mm/sec (feed velocity) | |

Electrostatic Charge Build-Up

The electrostatic charge build-up is measured using a commercial, calibrated influence field meter (from Eltex/Weil am Rhein, type EMF 57) at a constant distance of 2 cm from the roll.

EXAMPLE 1

A 13.1 μm thick ABA film was produced by the known coextrusion method, B representing the core layer and A the outer layers.

The core layer B contained 50% by weight of PET having an SV value (DCE) of 780 and 50% by weight of recycled PET having an SV value (DCE) of 740.

The outer layers A essentially comprised a PET having an SV value (DCE) of 780 and contained 4500 ppm of $CaCO_3$ having a mean particle diameter of 0.6 μm and 4500 ppm of $Al_2O_3$ having a mean particle diameter of 0.2 μm, measured in each case by the Sedigraph method. The thickness of the outer layers was 1 μm.

After production, the film was made up by means of high-speed make-up machines, which were equipped with the electrical discharge rods described, to give customer rolls having a width of 1.2 m.

COMPARATIVE EXAMPLE 1

Example 1 was repeated. The film produced was made up on the high-speed make-up machines from Example 1. In contrast to Example 1, however, discharge was effected using the conventional electrical discharge means installed as standard by the manufacturer.

The results are shown in the Table below.

| | Example 1 | Comparative Example 1 |
|---|---|---|
| Thickness | 13.1 μm | 13.1 μm |
| Light transmittance | 92% | 92% |
| Haze | 2.7% | 2.7% |
| Ra value | 13 | 13 |
| Modulus of elasticity, longitudinal | 4200 N/mm² | 4200 N/mm² |
| Modulus of elasticity, transverse | 5100 N/mm² | 5100 N/mm² |
| Electrostatic charge build-up after make-up | −35 kV/m | −300 kV/m |
| Contact pressure | 320 N/m | 320 N/m |
| Laser defect rate after magnetic tape coating and after cutting of the magnetic tape | 0.9% | 4.2% |

What is claimed is:

1. An at least single-layer, biaxially oriented film support for magnetic recording media which is predominantly composed of crystallizable polyester, having a thickness in the range from 1 to 40 μm, wherein the film has, over its total roll length and roll, width and after it has been made up into customer rolls, an electrostatic charge build-up which is in the range from about −80 kV/m to about +80 kV/m, being made by a process wherein which the molten polyester material is extruded through a slot die and quenched as a substantially amorphous prefilm on a chill roll, this film is then heated up again and is oriented in the longitudinal and transverse direction or in the transverse and longitudinal direction or in the longitudinal direction, in the transverse direction and again in the longitudinal direction and/or transverse direction, the orientation temperatures being set at values of about $T_g+10$ K to about $T_g+60$ K, the stretching ratio of the longitudinal stretching being set to a value in the range from about 2 to about 6, that of the transverse stretching being set to a value in the range from about 2 to about 5, and that of any second longitudinal stretching carried out being set to a value in the range from about 1.1 to about 3, and in which thereafter heat setting of the film is carried out at oven temperatures of from about 200 to about 260° C. and the film is then cooled and rolled up, wherein the rolled-up film is then wade up on a make-up machine at speeds in the range from about 300 to about 400 m/min and wherein the make-up procedure is carried out using winding tensions in the range of 90 N/m to 200 N/m and contact pressures in such a way that the contact pressure is set in the range from about 300 N/m to about 350 N/m.

2. The film support as claimed in claim 1, wherein its electrostatic charge build-up is in the range from about −70 kV/m to about +70 kV/m, the contact pressure of the roll cutters during make-up being in the range from about 310 N/m to about 340 N/m.

3. A magnetic tape comprising the film support as claimed in claim 1, and a coating of a magnetic recording media thereon, said coating having a laser defect rate of ≦2% after coating with magnetic recording medium.

4. The film support as claimed in claim 1, being multi-layered.

5. The film support as claimed in claim 1, which essentially comprises a crystallizable polyester having an RSV value in the range from about 0.4 to about 1.0 dl/g, which is a polycondensate, selected from the group consisting of polyethylene terephthalate, polybutylene terephthalate, poly-1,4-cyclohexylenedimethylene terephthalate, polyethylene 2,6-naphthalenedicarboxylate, polyethylene naphthalate/bibenzoate, polyethylene p-hydroxybenzoate or mixtures of these.

6. The film support as claimed in claim 1, which contains further additives in amounts in the range from about 0.1 to about 20% by weight, the additives being selected from the group consisting of inorganic organic pigments, stabilizers, antioxidants, antiblocking agents or mixtures of these.

7. The process as claimed in claim 1, wherein the film is drawn between electrical discharge means along the film path in the make-up machine.

8. The process as claimed in claim 7, wherein the electrical discharge means are arranged close to the roll and wherein the discharge means are discharge rods.

* * * * *